United States Patent
Fitzgerald

(10) Patent No.: US 9,943,188 B2
(45) Date of Patent: Apr. 17, 2018

(54) FOOD COOKER

(75) Inventor: Christian Fitzgerald, Atlanta, GA (US)

(73) Assignee: FC Industries, LLC, Atlanta, GA (US)

( * ) Notice: Subject to any disclaimer, the term of this patent is extended or adjusted under 35 U.S.C. 154(b) by 0 days.

(21) Appl. No.: 11/071,986

(22) Filed: Mar. 3, 2005

(65) Prior Publication Data

US 2005/0229916 A1 Oct. 20, 2005

Related U.S. Application Data

(63) Continuation of application No. 10/465,252, filed on Jun. 19, 2003, now abandoned.

(60) Provisional application No. 60/390,483, filed on Jun. 21, 2002.

(51) Int. Cl.
*A47J 33/00* (2006.01)

(52) U.S. Cl.
CPC .................................. *A47J 33/00* (2013.01)

(58) Field of Classification Search
CPC .......................................................... A47J 33/00
USPC ............. 126/25 R, 9 R, 9 B, 273.5, 274, 30;
99/324, 359, 403, 444, 446–449, 467,
99/473, 419, 421 HV, 421 R, 421 H;
426/520, 523, 466
See application file for complete search history.

(56) References Cited

U.S. PATENT DOCUMENTS

| | | | |
|---|---|---|---|
| 1,284,299 A | 11/1918 | Freeon | |
| 1,485,292 A | 2/1924 | Popper | |
| 2,049,481 A * | 8/1936 | Walterspiel | 99/444 |
| 3,139,023 A * | 6/1964 | Irwin | 99/476 |
| 3,791,368 A | 2/1974 | Hunt | |
| 4,388,743 A * | 6/1983 | Hellinger et al. | 16/435 |
| 4,503,835 A | 3/1985 | Williams | |
| 4,850,333 A | 7/1989 | Dellrud et al. | |
| 4,924,845 A | 5/1990 | Johnson et al. | |
| 5,183,304 A * | 2/1993 | Mair | A47J 45/10 294/10 |
| 5,404,864 A | 4/1995 | Kent, Jr. | |
| 5,431,093 A | 7/1995 | Dodgen | |
| 5,456,163 A | 10/1995 | Ceravolo | |
| 5,535,664 A * | 7/1996 | Rokowski | 99/448 |
| 5,649,477 A | 7/1997 | Lingwood | |
| 5,687,704 A | 11/1997 | Lerch et al. | |
| 5,752,497 A | 5/1998 | Combs et al. | |
| 5,797,386 A | 8/1998 | Orr | |
| 5,823,174 A | 10/1998 | Andress | |
| 5,832,915 A | 11/1998 | Skidmore et al. | |
| 5,842,463 A | 12/1998 | Hall | |
| 5,983,882 A | 11/1999 | Ceravolo | |
| 6,095,130 A | 8/2000 | Faraj | |

(Continued)

OTHER PUBLICATIONS

COMALCO of Texas, USA, Rocket Roaster Owner's Manual, 12 pages, date of publication unknown.

(Continued)

*Primary Examiner* — Jessica Yuen
(74) *Attorney, Agent, or Firm* — Taylor English Duma LLP

(57) ABSTRACT

A method and apparatus for charcoal cooking of food utilizing a cook base and a removable cover mating with the cook base. The cooker has a substantially sealed interior cooking chamber for cooking food and an exterior portion with one charcoal heat source near the bottom of the cook base and another charcoal heat source on top of the removable cover, thereby separating the food and the fire.

13 Claims, 6 Drawing Sheets

(56) References Cited

U.S. PATENT DOCUMENTS

| | | | |
|---|---|---|---|
| 6,123,015 | A | 9/2000 | McLain et al. |
| 6,125,835 | A | 10/2000 | Montano |
| 6,138,661 | A | 10/2000 | Cooper |
| 6,158,426 | A | 12/2000 | Wardell |
| 6,182,650 | B1 | 2/2001 | Tuttle |
| 6,213,006 | B1 | 4/2001 | Reardon et al. |
| 6,272,976 | B1 | 8/2001 | Berryman |
| 6,289,795 | B1 | 9/2001 | McLemore |
| 6,321,640 | B1 | 11/2001 | Tseng |
| 6,688,301 | B1 | 2/2004 | McNeil |
| 6,706,301 | B2 * | 3/2004 | Vaughan ................. 426/466 |
| 6,718,966 | B1 * | 4/2004 | Barbour ................. 126/25 R |
| 6,945,243 | B1 * | 9/2005 | Walker ............ A47J 37/0623 |
| | | | 126/9 R |
| 2001/0042545 | A1 | 11/2001 | Robin |
| 2003/0234014 | A1 | 12/2003 | Fitzgerald |
| 2006/0037605 | A1 | 2/2006 | Fitzgerald |
| 2009/0107483 | A1 | 4/2009 | Fitzgerald |

OTHER PUBLICATIONS

Fitzgerald, Christian; U.S. Provisional Patent Application entitled: Portable Fire Pit, having U.S. Appl. No. 60/592,661, filed Jul. 30, 2004, 10 pgs.

* cited by examiner

FOOD COOKER

CROSS-REFERENCE TO RELATED APPLICATION

This application is a continuation of U.S. patent application Ser. No. 10/465,252, filed Jun. 19, 2003 now abandoned, which in turn claims priority to U.S. Provisional Patent Application Ser. No. 60/390,483, filed Jun. 21, 2002, which are hereby incorporated by reference in their entireties for all purposes.

TECHNICAL FIELD

The present invention relates generally to a cooking device, and more specifically to a charcoaled-fired cooking device wherein the food is cooked without direct exposure to the fire.

BACKGROUND OF THE INVENTION

A multitude of outdoor cookers have been created, presumably in hopes of improving the culinary quality and/or the ease of the cooking. For example, the following patents disclose various apparatuses and methods of cooking food in a device.

U.S. Pat. No. 4,924,845 of Johnson relates to a solid fuel cooker comprising upper and lower paraboloid-shaped members. The inner surface of the upper member (cover) focuses both radiant energy and convective heat around the item to be cooked situated in the upper portion of the apparatus. The upper portion of the cooker also includes a vent and a cap that serves both as a cover and as a measuring device for lighter fluid. The lower member (receptacle) houses the heating source. This invention provides means for concentrating the flow of air in an upward motion through the vent located at the top of the cooker.

U.S. Pat. No. 5,404,864 of Kent, Jr. relates to a portable outdoor cooking system which includes a combustion tube that houses an elongate fire chamber surrounding adjustable flaps which control the tube's intake and outflow of air. Food is placed across the upper opening of the tube for receiving the outflow of heat from the tube.

U.S. Pat. No. 5,649,477 of Lingwood relates to an outdoor cooking device comprising two or more heat sources located at the bottom portion of the device, means for supporting the food to be cooked above the heat sources, and a baffle between the food and the heat source so as to prevent drippings from the food from falling onto the heat source (thereby avoiding "flame-up").

U.S. Pat. No. 5,687,704 of Lerch, et al. relates to a portable grill having upper and lower conical-shaped inverted housings. The upper housing includes a grilling section supporting a grate for supporting charcoal or other solid fuel. The lower conical-shaped housing acts as a receptacle. The apertures are positioned in such a way as to provide convective-type heat transfer for cooking.

U.S. Pat. No. 5,752,497 of Combs, et al. relates to a portable outdoor cooking assembly utilizing a flue and damper mechanism.

U.S. Pat. No. 5,797,386 of Orr relates to a portable cooking device containing an open top and a burner housing located at the bottom portion of the device. A cooking grate is disposed on top of the burner housing and can be adjusted for obtaining two different cooking heights.

U.S. Pat. No. 3,823,174 of Andress relates to a portable cooking device containing an L-shaped open body, the bottom portion of which includes a grate for holding food, while the rear portion contains a vertically arranged fire chamber.

U.S. Pat. No. 5,842,463 of Hall relates to a portable camp stove having a fuel support grate positioned at the bottom of a combustion-chamber. Fuel is added to the chamber from the top and air is drawn into the chamber through a ring of intake apertures.

U.S. Pat. No. 6,095,130 of Faraj relates to a grill having horizontal shelves positioned along sidewalls for holding charcoal vertically along the sides in order to surround the item being cooked.

U.S. Pat. No. 6,138,661 of Cooper relates to a portable cooking stove comprising a bowl-shaped grate and a supporting column. The bowl is designed to hold burning wood or coal and includes holes for allowing air to pass through the bottom of the bowl to combust the coals. A cooking apparatus, such as a skillet, can be rested on the upper edge of the bowl for cooking.

U.S. Pat. No. 6,213,006 of Reardon relates to an outdoor portable grill containing a heat source at a bottom portion thereof, a cooking grate at the top portion and a heat-funnel positioned between the heat source and cooking grate.

U.S. Pat. No. 6,289,795 of McLemore, et al. relates to a cooking apparatus having a base pan for the heating element, a main body element located in the middle of the apparatus for containing the food to be cooked, and a cover supported by the base pan.

The just-described patents disclose many different cooker/grill arrangements. Each of the preceding arrangements has a heat source, in some cases a flame, which is directly exposed to the food. It can be appreciated that this type of direct-heat cooking can cause the food to dry out, as well as risk over-charring, flame-ups, or outright burning of the food. Moreover when the food piece is in the same basic container as the fuel, the container cannot be sealed as the fuel needs an open container to allow for oxygen for burning of the fuel, which as discussed, allows the food item to more quickly lose moisture and dry out.

Therefore, there yet is a need for a cooking apparatus and system that allows for the cooking of food outdoors without the flame or heat source being directly exposed to the food to be cooked. It is to the provision of such an apparatus that the present invention is primarily directed.

SUMMARY OF THE INVENTION

Briefly described, in a preferred form the present invention comprises a charcoal-fired cooker for cooking food. The cooker includes a cook base and a removable cover mating therewith. Together, the cook base and the removable cover define an interior cooking chamber for cooking food. The cook base includes an external heat source. The external heat source comprises a first charcoal container for containing charcoal positioned near a lower portion of the cook base. The removable cover includes another external heat source, held in a second charcoal container for containing charcoal.

So constructed, the charcoal-fired cooker cooks food in an indirect manner effectively and quickly. In this regard, the food is never directly exposed to the burning charcoal. Rather, the heat from the charcoal heats up the cook base and the removable cover from the outside. These heated parts then warm the air inside the interior cooking chamber to cook the food. The inventor has found this provides excellent results.

Preferably, the charcoal-fired cooker is shaped to be substantially cylindrical, substantially dome-shaped, or substantially egg-shaped. Also preferably, the cook base includes a floor and a food support for supporting food above the floor. In one form, the food support can be a vertically extending post. In another form, the food support can be a horizontally extending grate. Optionally, the cook base can include a removable drip pan positioned atop the floor.

Optionally, the cooker can include a middle portion that contains a grate or other means for supporting food pieces. The middle portion is placed between the lower and the upper portions. This arrangement facilitates the cooking of more than one type of food pieces. For example, a turkey or chicken could be cooked in the lower portion, and vegetables could be cooked or steamed in the upper portion.

Another option would be the inclusion of a pan to hold water, which assists in maintaining of the humidity level within the chamber, which allows, in part, the steaming of food pieces and helps to keep the food from drying out.

DETAILED DESCRIPTION OF THE PREFERRED EMBODIMENTS

Figure 1:
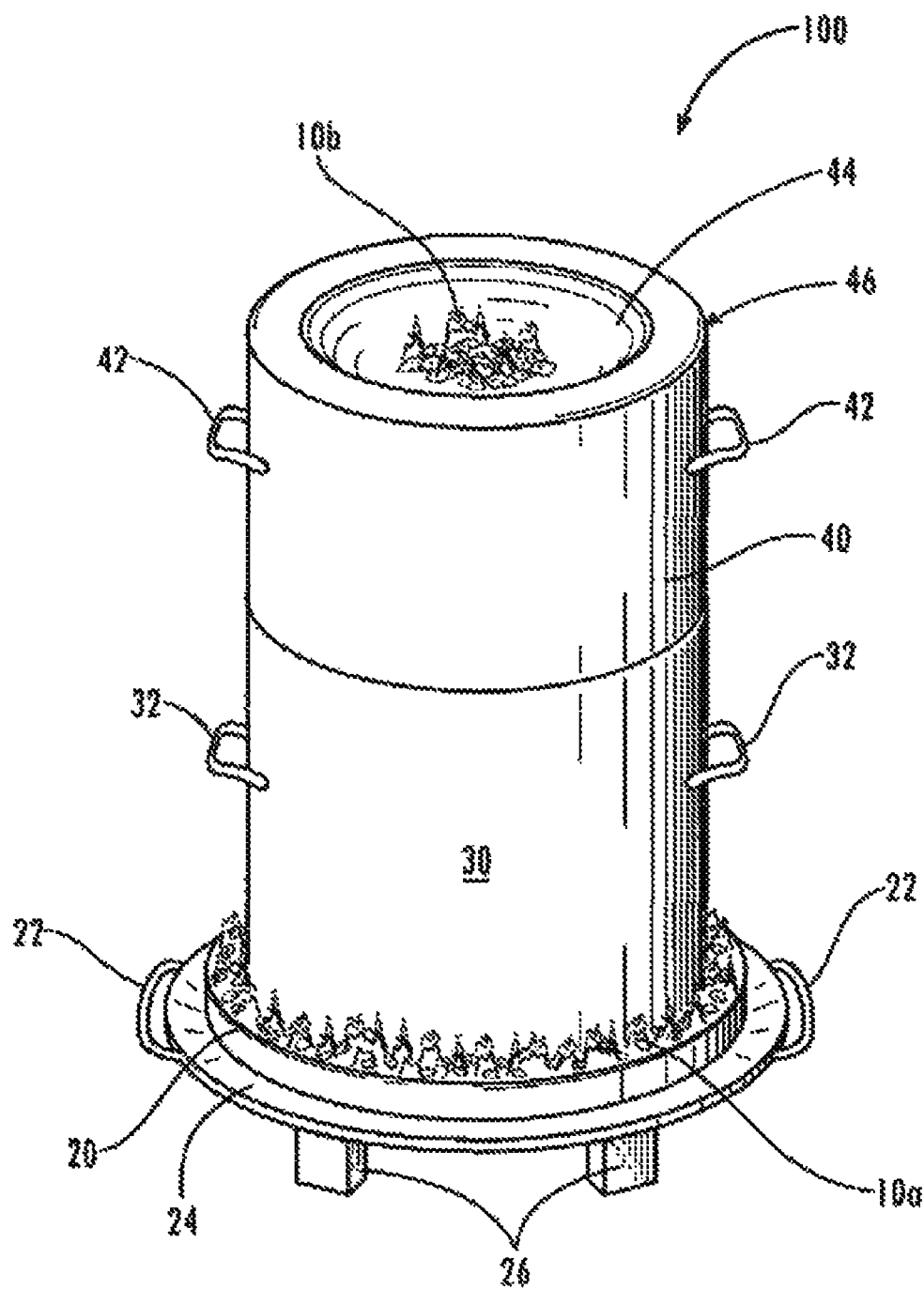
FIG. 1 is a perspective view of a food cooker in a first preferred form of the invention.

In describing the embodiments of the present invention, specific terminology is employed for the sake of clarity. However, the invention is not intended to be limited to the specific terminology so selected. Moreover, in the drawing figures like reference numerals refer to like parts throughout the several views.

Turning the reader's attention to FIG. 1, in a first embodiment a charcoal-fired cooker 100 has a cook base 30 and a cover 40. The cook base 30 has a side portion to which handles 32 are affixed. It can be preferable to fabricate handles 32 of non-heat conducting, or minimally heat conducting, material to lessen the risk of burns of the user.

Examples of such materials would be wood and plastic. The cook base 30 preferably is attached to or placed in a fire ring 20. It may be preferable to have fire ring 20 be a separate piece from the cook base 30 to assist in ease of cleaning and parts replacement. Also, it can be preferable to provide clips, sockets, sliders or the like to removably mate the fire ring 20 to the cook base 30.

Figure 4:
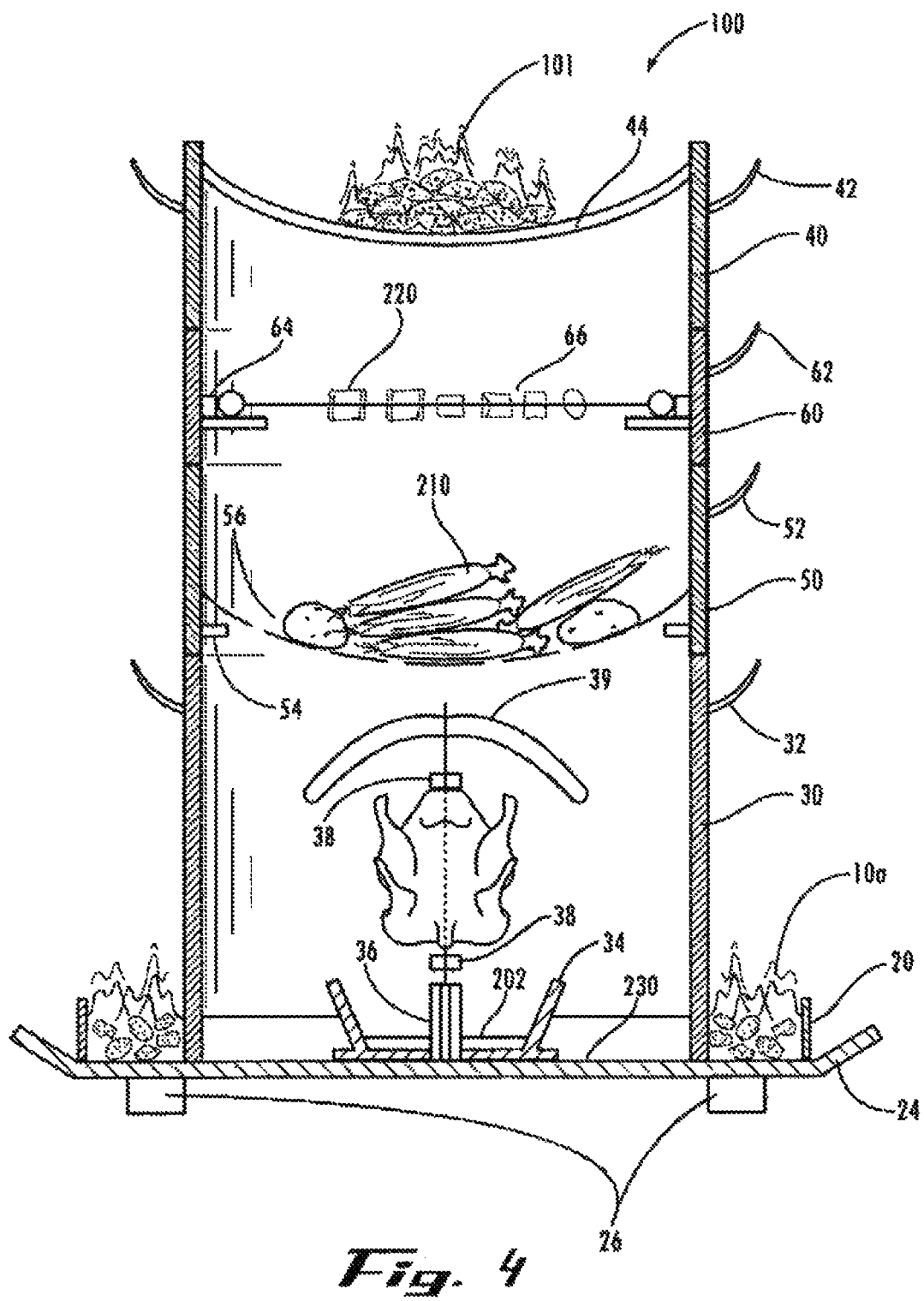
FIG. 4 is a schematic cross-sectional view of a food cooker in an alternate form of the invention.

An annular ledge 24 is fitted around the fire ring 20. The annular ledge 24 should be designed to protect the area beneath the food cooker 100 from the heat generated by the food cooker 100. Design criteria for the annular ledge 24 can include appropriate thickness, non-heat conducting or low heat conducting material, as well as providing a lip around the edge of the ledge 24 to assist in preventing the soot and ash and other materials from spilling from the fire ring 20 and falling below the ledge 24. As with the fire ring 20 being mated to the cook base 30, the fire ring 20 can be attached or mated in a similar fashion to the ledge 24. As shown in FIG. 4, the cook base 30 contacts and is directly attached to the ledge 24.

To assist in placement and transport, the handles 22 are affixed to the ledge 24. As with handles 32, the handles 22 can be made of non- or low-heat conducting material. Alternatively the handles 22 may be attached to the fire ring 20. In the present embodiment, the ledge 24 is a plate that covers the entire bottom of the cook base 30 and the fire ring 30, thereby acting as a floor. This can be preferable as it assists in providing heat transfer through the underside of the cook base 30.

Support legs 26 are affixed to the bottom of the ledge 24. Support legs 26 should provide sufficient clearance of the food cooker 100 from the ground to reduce the risk of fire under and around the food cooker 100. It is preferable to have at least three legs for stability of the food cooker 100 as one skilled in the art would appreciate that tipping of the food cooker 100 during use is highly undesirable.

Charcoal fire 10a is placed inside of the fire ring 20, which allows the charcoal fire 10a to be in contact with, or be juxtaposed to the cook base 30. Other embodiments include utilizing different combustible heat sources in place of charcoal, including wood. Preferably, the location of the fire ring 20 and the charcoal fire 10a on cook base 30 is near the bottom to facilitate heat transfer to the ledge 24 or to the floor of the cook base 30.

Cover 40 is placed on, and preferably mated to, the top of cook base 30. Cook base 30 and cover 40 should be mated as to prevent communication between the fire, which is external to the cooker 100, and the food, which is internal to the cooker 100. This mating can be done with groves, latches, sliders, notches or combinations thereof as well as with similar means. Cover 40 can have handles 42 affixed to the side portions of the cover 40 to allow for removal from the cook base 30 as well as for transport. Cover 40 has a concave top 44 that provides for placement of the charcoal fire 10b. In the present embodiment, upper ring 46 is utilized to protect against the spillage of charcoal fire 10b. As with the charcoal fire 10a, the alternatives to charcoal fire 10b include utilizing different combustible heat sources in place of charcoal, including wood. It should be noted that one or both of the charcoal fire 10a-b could use alternative fuel sources.

Figure 2:
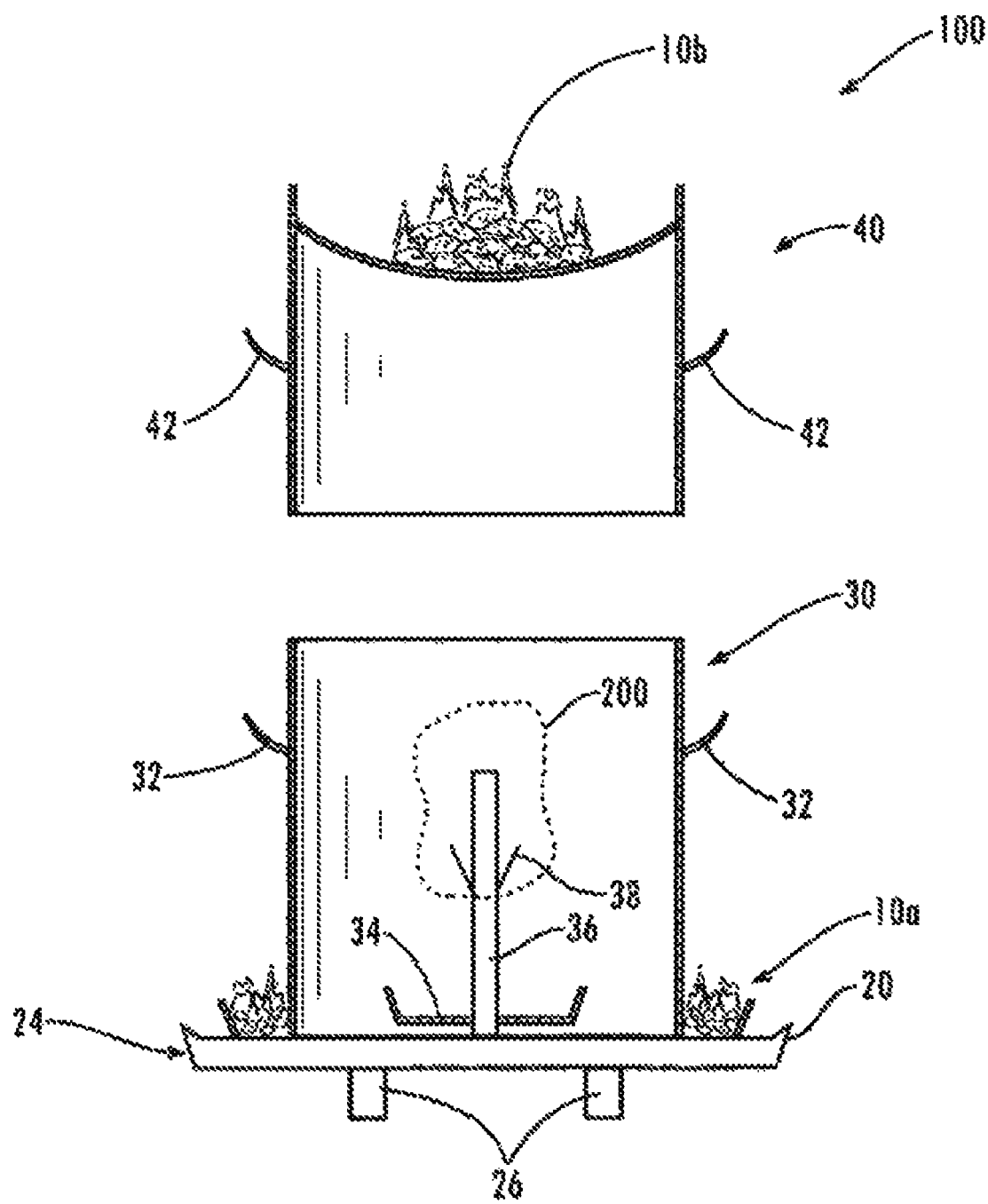
FIG. 2 is a schematic cross-sectional view of the food cooker of FIG. 1 with the top and bottom portions thereof separated.

Now turning to FIG. 2, the reader should direct his or her attention to the depiction of the cross-sectional view of the food cooker 100. Cover 40 is removed from the cook base 30. The inner portion of the cook base 30 is placed drip pan 34. Substantially in the center of drip pan 34, and substantially perpendicular from the ledge 24 is placed post 36. Post 36 can include fork(s) 38 that assists in holding the food item 200 above drip pan 34. Food item 200 can be a turkey, chicken, roast or the like. Alternatives to post 36 may include a grate, basket, skewer or the like that would be substantially parallel to ledge 24. This may include notches or other canaliculations, fillets, edges, brackets or the like on the interior of the sides of the cook base 30 which will allow placement of grates, baskets, skewer or the like which will act as an alternative food containment means.

Figure 3:
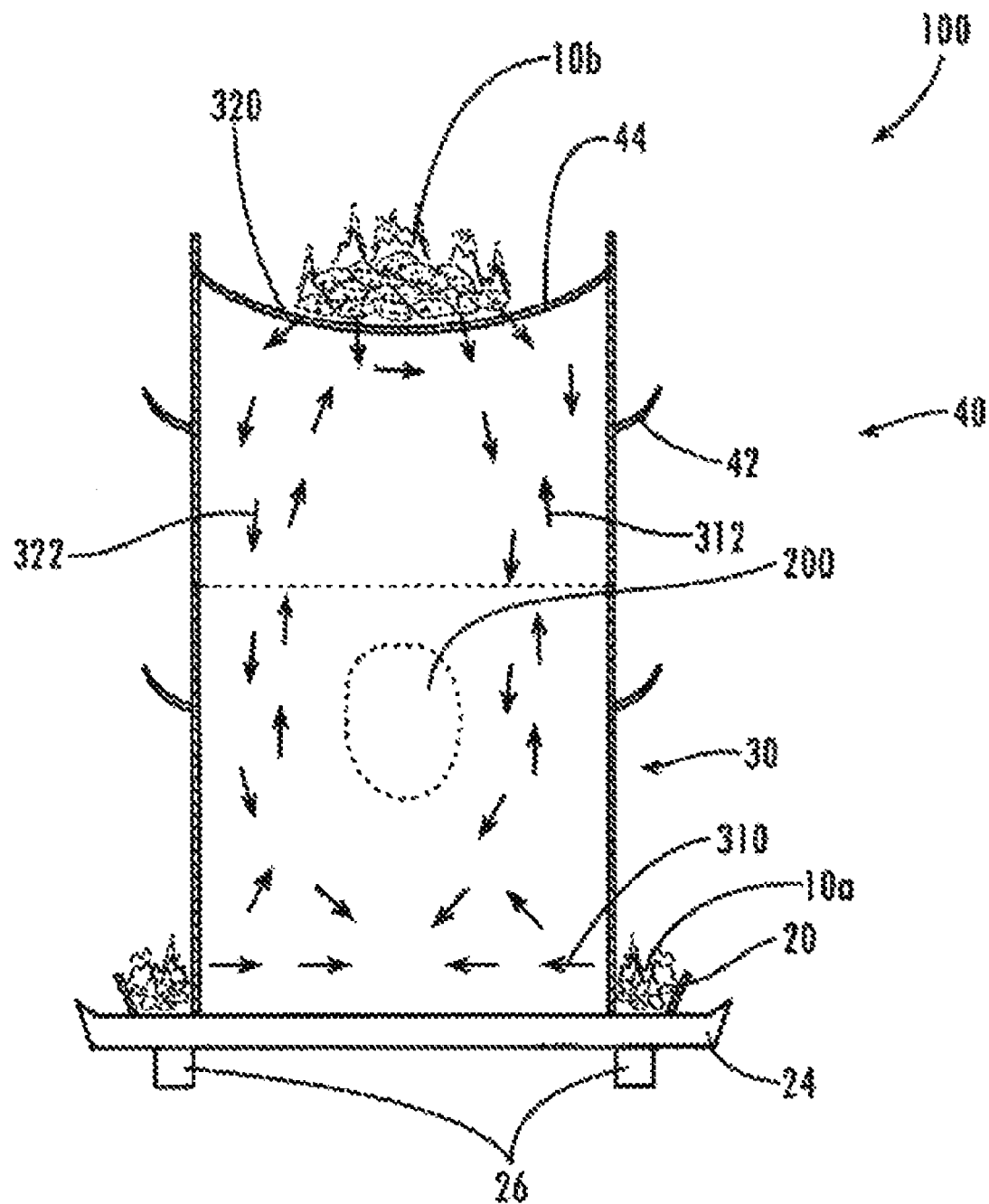
FIG. 3 is a schematic cross-sectional view of the food cooker of FIG. 1 showing expected heat flow patterns with the top and bottom portions are mated.

As shown in FIG. 3, it is believed that the charcoal fire 10a results in creating first a heat flow 310 which would radiate along the ledge 24 and up from the side walls of the cook base 30, continuing upwards as heat flow 312. Conversely, the charcoal fire 10b has first heat flow 320 which flows along the concave top 44 and down the side walls of removable top 40, continuing downwards as heat flow 322. The reader should note that while heat flows 310-322 are approximate and hypothetical in nature, a convection flow is present in and around the food cooker 100. Heat flows 310-322 therefore provide sufficient heat to cook the food item 200 sufficiently, while assisting in the prevention of possible "flare-ups" from grease dripping on the flame present in the charcoal or other typical flareups commonly associated with the burning of a food item in other food cookers.

As the mating of the cook base 30 and the removable top 40 preferably assists in preventing the escape of moisture from the cooker 100, food item 200 will not likely dry out, as much as in typical food cookers. Other embodiments of use would include the placing of an appropriate amount of water in a drip pan to provide higher moisture content in the inner portion of the food cooker 100. As concave top 44 is concave, the collection of the moisture: would be at the lowest point of the concave top 44 and then would drip downward into drip pan 34. Drip pan 34 will therefore not only collect the grease and fat drippings from the food item 200, but also water falling from the concave top 44.

An alternative preferred embodiment of the food cooker 100 is shown in FIG. 4. FIG. 4 is a cross sectional view of the food cooker 100, where lower middle portion 50 and upper middle portion 60 are mated, as shown, to cook bottom 30 and removable top 40 respectively, as well as to one another.

As shown, the lower middle portion 50 has handles 52 on the exterior portion and bracket 54 on the interior portion. Basket 56 rests on the bracket 54. Food items 210 can be inside basket 56. These may include carrots, potatoes, other vegetables and the like. Alternatively, the food items 210 can hold fish, pork, or other such food items. Basket 56 may then include a top portion that would be placed on top of food item 210. The upper middle portion 60 also has handles 62 on the on the exterior portion and bracket 64 on the interior portion. Bracket 64 can be made larger so that it is capable of holding in place skewer 66 so that food items 220 can be placed on it. Food items 220 can include cube meat, onions, tomatoes, peppers and the like. Alternative to skewer 66 could be a grate, grill or the like which would allow for placing food items 220 directly on top.

Splash guard 39 is placed on the post 36 over the food item 200. As 30 discussed previously, moisture will likely collect and drip from the concave top 44 near the center axis of the food cooker 100. This would lead to dripping on the food item 200. In the present embodiment, slash guard 39 will direct the moisture, typically essentially water to the outside of the drip pan and collection in water collection 230. Conversely, the grease and fat drippings from the food item 200 will collect in the grease collection 202.

As discussed prior, during use of the food cooker 100 and prior to lighting of charcoal 10a-b, it can be preferable to add water to the water collection 230 to increase the moisture content inside the food cooker 100.

Additionally, it can be preferable to provide appropriate size slash guards in middle portions 50, 60.

When using the food cooker 100 it can be preferable to place the food item 200 in cook base 30 along with any needed drip pan 34, post 36, forks 38 and slash guard 39. Also at this time, it is a preferable time to add water to the water collection 230, if desired. Alternative embodiments of the cook base 30 may include utilizing baskets, grills, skewers, grates or the like.

One will then mate lower middle portion 50 with the cook base 30. One would then place basket 56 of the bracket 54 and then food item 210 in the basket 56. As mentioned, a splash guard and/or top basket can be placed on the food item 210 and this point.

Then one will mate the upper middle portion 60 with the lower middle portion 50, once again placing the skewer 66 (or one of the previously discussed alternatives) onto the bracket 64. If one uses the skewer 66, then the food items 220 should be skewered on the skewer 66 just prior to the placement on the bracket 64. When preparing the skewer 66 with the food items 220 it would preferable to have the middle of the skewer 66 to not contain any food items 220, as the skewers 66 will be typically laid in the horizontal plane as each skewer 66 with a vertical rotation about the center of one another to give an appearance similar to bicycle spokes. As the skewers 66 will intersect substantially at the center of each of skewer 66, it is preferable that no food item 220 is in the way. The removable top 40 is then mated to the upper middle portion 60.

The charcoal fire 10a is created or placed in the fire ring 20 and the charcoal fire 10b is created or placed in the concave top 44.

The food items 200-220 are then cooked the appropriate times and then removed and enjoyed.

Finally, it will be understood that the preferred embodiment has been disclosed by way of example, and that other modifications may occur to those skilled in the art without departing from the scope and spirit of the appended claims.

Figure 5:
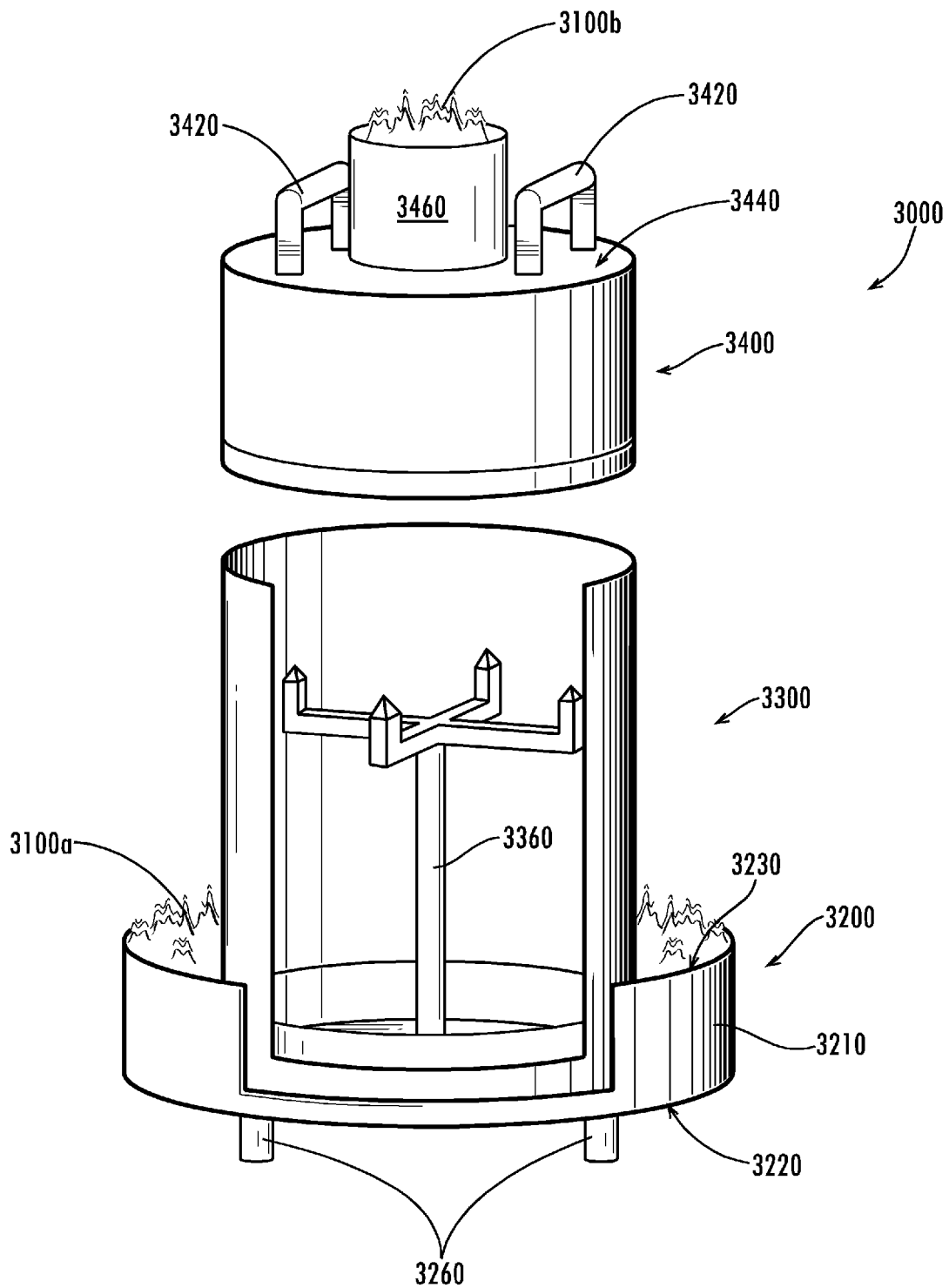
FIG. 5 is a perspective view and partial cross-sectional view of a food cooker in accord with an embodiment of the invention

Another embodiment of a food cooker 3000 is seen in FIG. 5. Food cooker 3000 includes several elements similar to cooker 100. The food cooker 3000 includes a cook base 3300 and a removable cover 3400. The removable cover includes a top 3440 that faces upward. Handles 3420 are upstanding and connected to the top 3440. Charcoal fires 3100a,b are seen, where fire 3100b is included in a heat source container 3460 on the top 3440 and fire 3100a is included in fire ring 3200. Charcoal fires 3100a,b are similar to charcoal fires 10a,b. The heat source container 3460 is smaller in cross-sectional profile or width than the removable cover 3400. The fire ring 3200 is included around a bottom portion of the cook base 3300. A wall 3210 has a lip. Legs 3260 support the cook base 3300. A post 3360 is seen in the food cooker 3000. Fire ring 3200 includes bottom edge 3220 and top edge 3230.

Figure 6A:
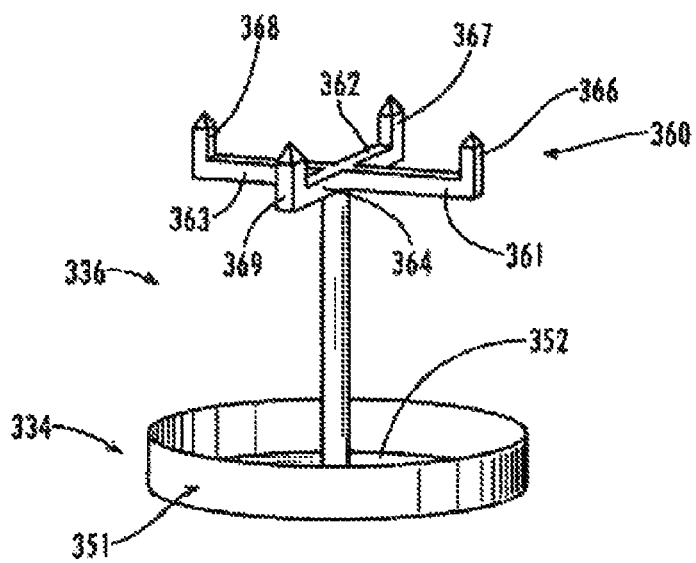
FIG. 6A is a schematic perspective view of one embodiment of a post and a drip pan of the food cooker of FIG. 5.
Figure 6B:
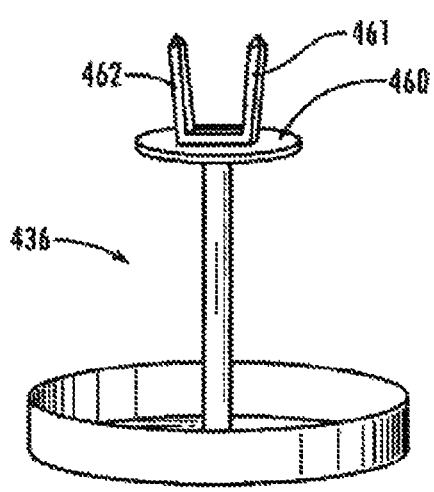
FIG. 6B is a schematic perspective view of one embodiment of a post and a drip pan of the food cooker of FIG. 5.
Figure 6C:
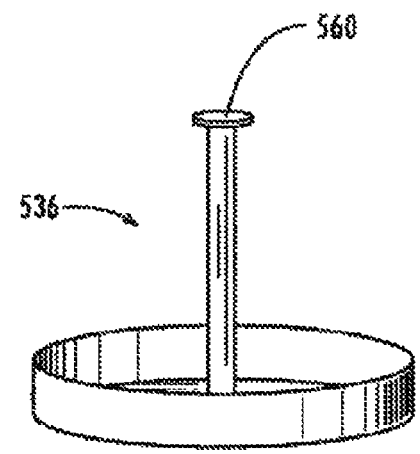
FIG. 6C is a schematic perspective view of one embodiment of a post and a drip pan of the food cooker of FIG. 5.

Multiple embodiments of posts and drip pans are shown in FIGS. 6A, 6B, and 6C. In FIG. 6A, a drip pan 334 is seen with a side wall 351 and a bottom floor 352. The post 336 extends upwardly from the bottom floor 352. A main food hanger 360 includes forks 366,367,368,369 and arms 361, 362,363,364 on a post 336. Another embodiment seen in FIG. 6B includes post 436 connected to disc 460 from which forks 461,462 protrude. Another embodiment is shown in FIG. 6C, which includes circular plate 536 and circular plate 560.

I claim:

1. A cooker for cooking food comprising:
   a cook base including walls defining an interior and an exterior of the cook base,
   a combustible heat source containment area substantially next to the exterior of the cook base, the combustible heat source containment area including a fire ring and a ledge, the ledge defining a plate, the walls of the cook base contacting and directly attached to the ledge, the fire ring positioned around a lower portion of the cook base such that the interior of the cook base is sealed from the fire ring;

a food piece containment area in the interior of the cook base, wherein the food piece containment area includes a floor defined by the ledge and a food support for supporting food above the floor;

a removable cover including a top and at least one downwardly extending wall, wherein the removable cover is able to be mated to the cook base such that the at least one downwardly extending wall of the removable cover is aligned with the walls of the cook base, wherein the removable cover mated to the cook base defines a sealed interior cooking chamber, the interior cooking chamber defining a closed container that is configured to prevent the escape of moisture from the interior cooking chamber and to prevent oxygen from entering the interior cooking chamber, wherein the removable cover includes an exterior heat source container attached to a top of the removable cover, wherein an outer diameter of the cook base is larger than an inner diameter of the exterior heat source container; and a pair of heat-resistant handles extending at least partially upward from the top of the removable cover, wherein the handles are attached to the removable cover and are positioned on opposite sides of the heat source container to allow the removable cover to be removed from the cook base.

2. The food cooker of claim 1 further comprising a removable drip pan positioned in the cook base and contacting the floor.

3. The food cooker of claim 1, wherein the food support has one or more forks extending therefrom.

4. The food cooker of claim 1, wherein the cooker is configured to cook food only in an indirect manner from outside the interior cooking chamber.

5. The food cooker of claim 1, wherein the cooker is configured to prevent food within the interior cooking chamber from being directly exposed to any burning heat source.

6. A food cooker comprising:
a cook base including at least one side wall having a top edge and a bottom edge;

a fire ring assembly including a fire ring and a ledge, the ledge defining a plate, the ledge contacting and directly attached to the bottom edge of the at least one side wall of the cook base, the fire ring mated with the ledge such that an interior of the cook base is sealed from the fire ring, the at least one side wall, the ledge, and the fire ring defining a heat source containment area;

a cover including at least one downwardly-extending side wall, the at least one downwardly-extending side wall having a cross-sectional profile, the cross-sectional profile matching a cross-sectional profile of the at least one side wall of the cook base; and a heat source container attached to a top of the cover, the heat source container having an inner diameter smaller than an outer diameter of the at least one side wall of the cover, wherein the cook base and the cover are configured so that the at least one side wall of the cover is aligned with the at least one side wall of the cook base and a bottom end of the cover contacts a top end of the cook base to define a sealed interior cooking chamber, the at least one side wall between the heat source containment area and the sealed interior cooking chamber, the interior cooking chamber defining a closed container that is configured to prevent the escape of moisture from the interior cooking chamber and to prevent oxygen from entering the interior cooking chamber.

7. The food cooker of claim 6, wherein the cover is removable.

8. The food cooker of claim 6, wherein the heat source container is a charcoal container.

9. The food cooker of claim 6, wherein the cook base and the cover are cylindrical.

10. The food cooker of claim 6, wherein the heat source container is a charcoal container.

11. The food cooker of claim 6, wherein the heat source container contains an alternative fuel source.

12. The food cooker of claim 6, wherein the food cooker is configured to cook food only in an indirect manner from outside the interior cooking chamber.

13. The food cooker of claim 6, wherein the food cooker is configured to prevent food within the interior cooking chamber from being directly exposed to any burning heat source.

* * * * *